(No Model.)
L. GIBBS.
LAWN RAKE.
No. 496,220. Patented Apr. 25, 1893.
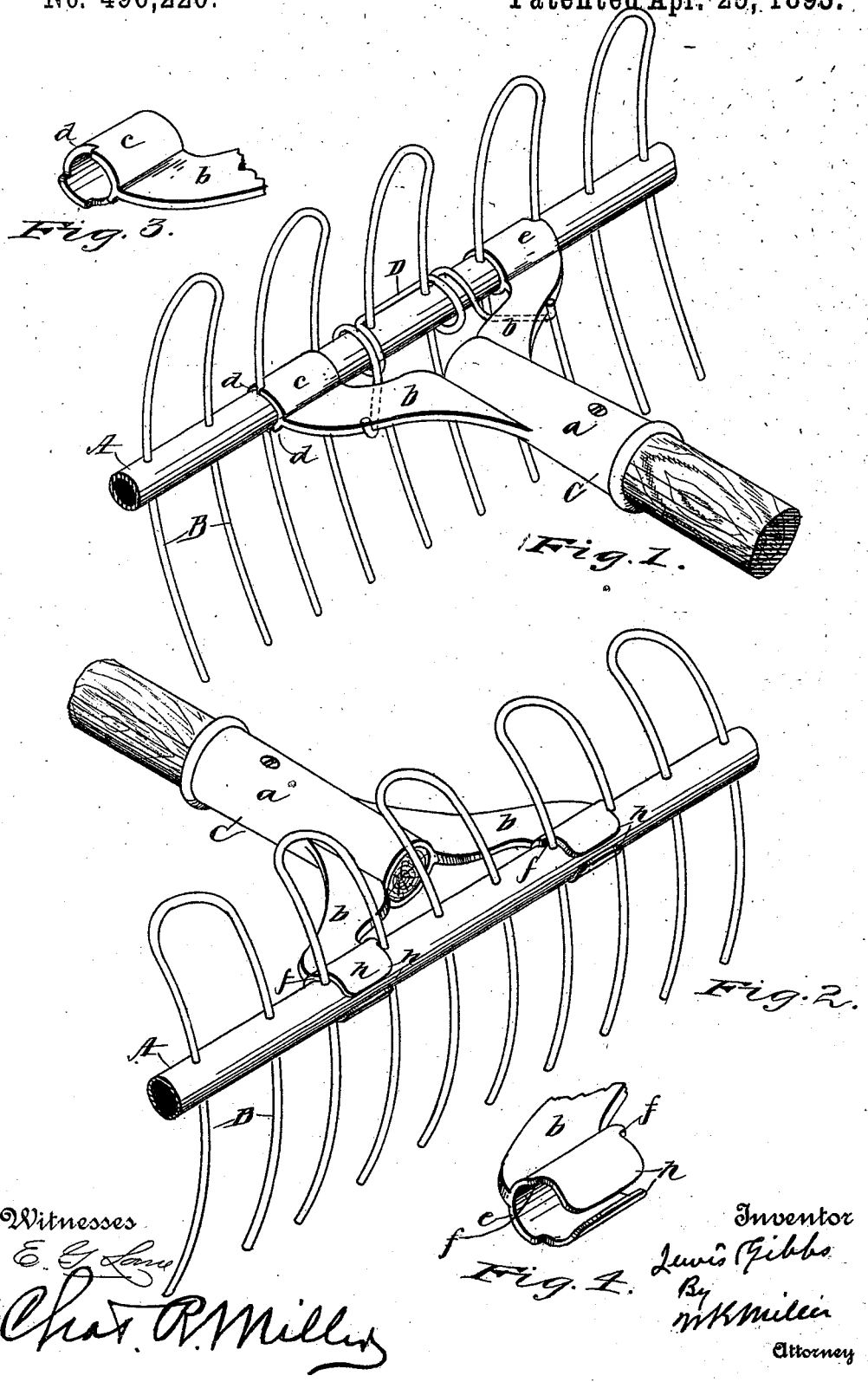
Witnesses
E. G. Lane
Chas. R. Miller
Inventor
Lewis Gibbs
By M. K. Miller
Attorney

United States Patent Office.

LEWIS GIBBS, OF CANTON, OHIO.

LAWN-RAKE.

SPECIFICATION forming part of Letters Patent No. 496,220, dated April 25, 1893.

Application filed September 19, 1892. Serial No. 446,314. (No model.)

*To all whom it may concern:*

Be it known that I, LEWIS GIBBS, a citizen of the United States, and a resident of Canton, county of Stark, State of Ohio, have invented a new and useful Improvement in Lawn-Rakes, of which the following is a full, clear, and exact description, reference being had to the accompanying drawings, making part of this specification.

My invention relates to improvements in lawn rakes, and consists of certain features of construction and combination of parts as will be hereinafter described and pointed out in the claims.

Figure 1, is a view in perspective of a lawn-rake illustrating my invention, from the front side. Fig. 2, is a similar view of rake from the rear. Fig. 3, is a similar view of the ferrule or sleeve portion of the handle socket. Fig. 4, is a similar view of a clasp or clip portion of the handle socket.

Referring to Fig. 1 of the drawings, A represents a metallic, tubular head, the teeth B of which may be of any desired form; the teeth are passed through and secured in apertures provided in the tubular head, substantially as shown. The handle socket or support C, is of the form shown, or substantially so, having a socket portion $a$ and prongs $b$, extending obliquely and rearwardly from the socket; at the end portions of said prongs is provided a ferrule or sleeve $c$ through which the tubular head is passed before inserting the teeth. The tubular head may be secured in the ferrule or sleeve $c$, against rotation or longitudinal movement, by passing one or more of the teeth through the ferrule, or by placing them in recesses or stop notches $d$ provided in the edge of the ferrule $c$, diametrically opposite or thereabout. When desired, a slight rotary movement of the tubular head in the ferrule, may be provided by slightly elongating the recesses or stop $d$ in the edge of the ferrule $c$, and providing a coil spring D of the form substantially as shown, having its coiled portion about the head, a portion secured to the head and the end portion secured or held against rotation by engagement with the prongs $b$ or some portion of the handle.

The object sought and attained by the structure described in the foregoing paragraph, is to provide means whereby the rake may rock in its connections with the handle, so that in the back or reverse movement, the rake-head will rotate to allow the back part of the teeth to engage the stubble by which the grass or leaves may be removed from the teeth and not dragged back with the rake, and at the end of the reverse movement the energy of the spring, exerted over and forward, will turn the head and teeth into normal position.

In Fig. 2, is shown a tubular rake head A, and teeth B, and a handle socket C, having prongs $b$, at the end of which is provided an open clasp $e$ having shoulders $f$ to engage the teeth B, and lips or end portions $h$ to pass between and embrace the head A; the shoulders $f$ engaging the teeth will hold the head against rotation or longitudinal movement.

Having thus fully described the nature and object of my invention, what I claim, and desire to secure by Letters Patent, is:—

1. A rake comprising a handle support a toothed head journaled in said handle support to allow the teeth to rock in the direction of the handle and a spring to return the teeth to their normal position whereby when the rake is drawn toward the operator the teeth remain rigid and when forced forward they rock to disengage the leaves therefrom, substantially as set forth.

2. The combination in a lawn rake of the head A and teeth B, of the handle socket C, having prongs $b$ extended therefrom, the clasps $c$ having a stop $d$ provided therein and the spring D adapted to rotate the head one way, in the ferrules $c$, substantially as described and for the purpose set forth.

3. The combination in a lawn rake of the tubular head A, and teeth B, of the handle socket C, having outwardly projected sockets $b$, having at their end portions clasp $e$ having stops or shoulders $f$ in the sides thereof to hold the head and teeth in operative position, substantially as described and for the purpose set forth.

In testimony whereof I have hereunto set my hand this 15th day of September, A. D. 1892.

LEWIS GIBBS.

Witnesses:
W. K. MILLER,
CHAS. R. MILLER.